UNITED STATES PATENT OFFICE.

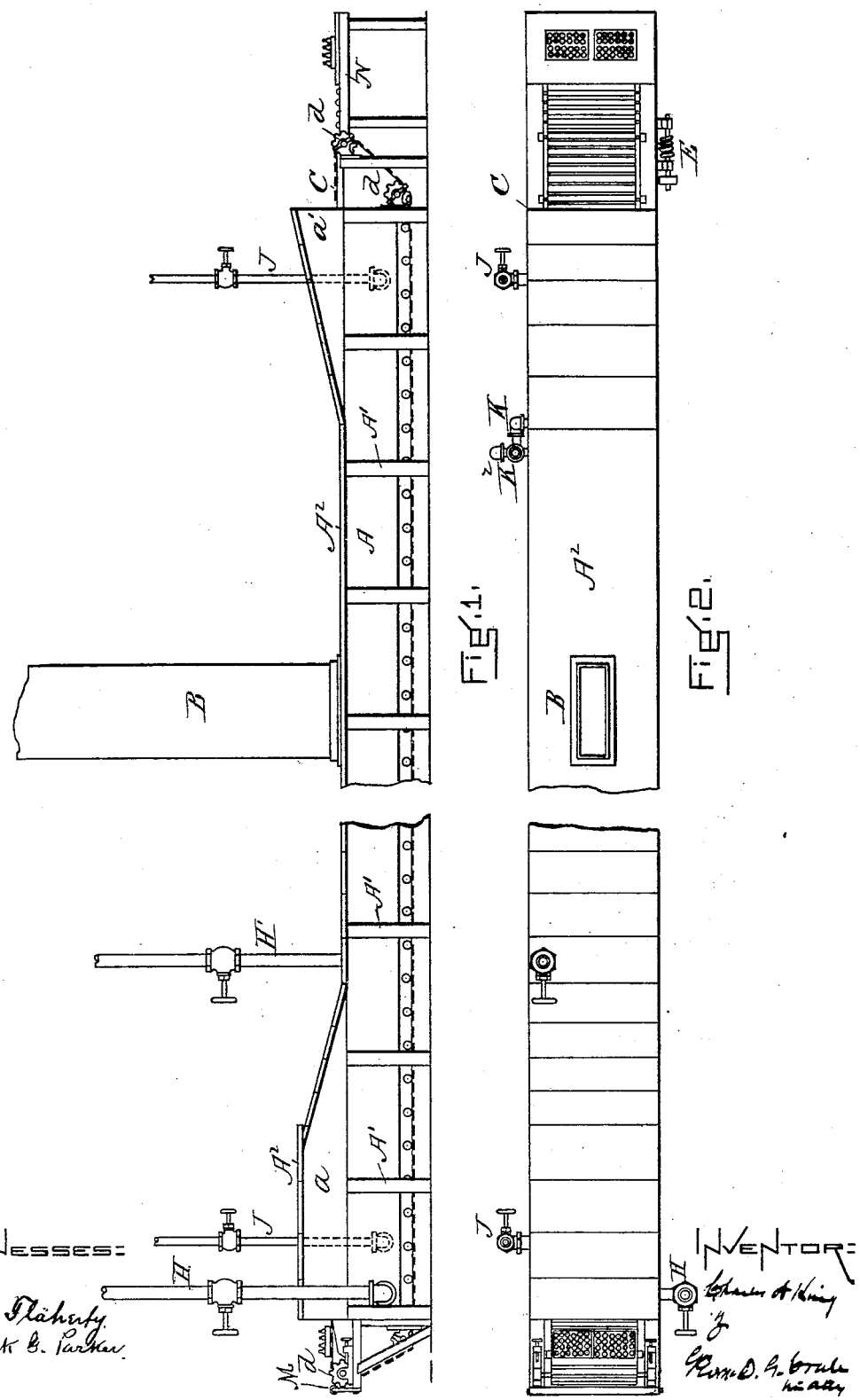

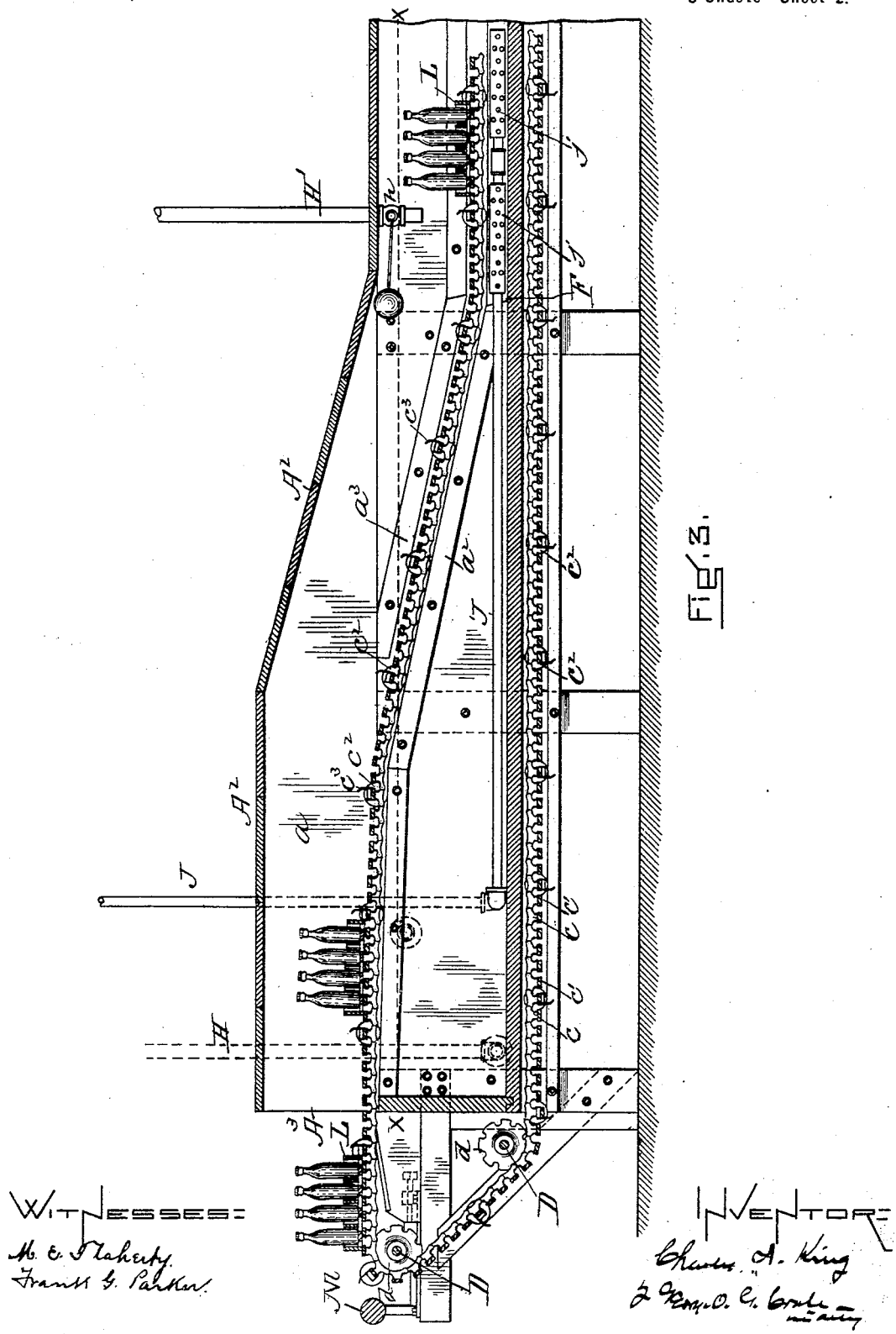

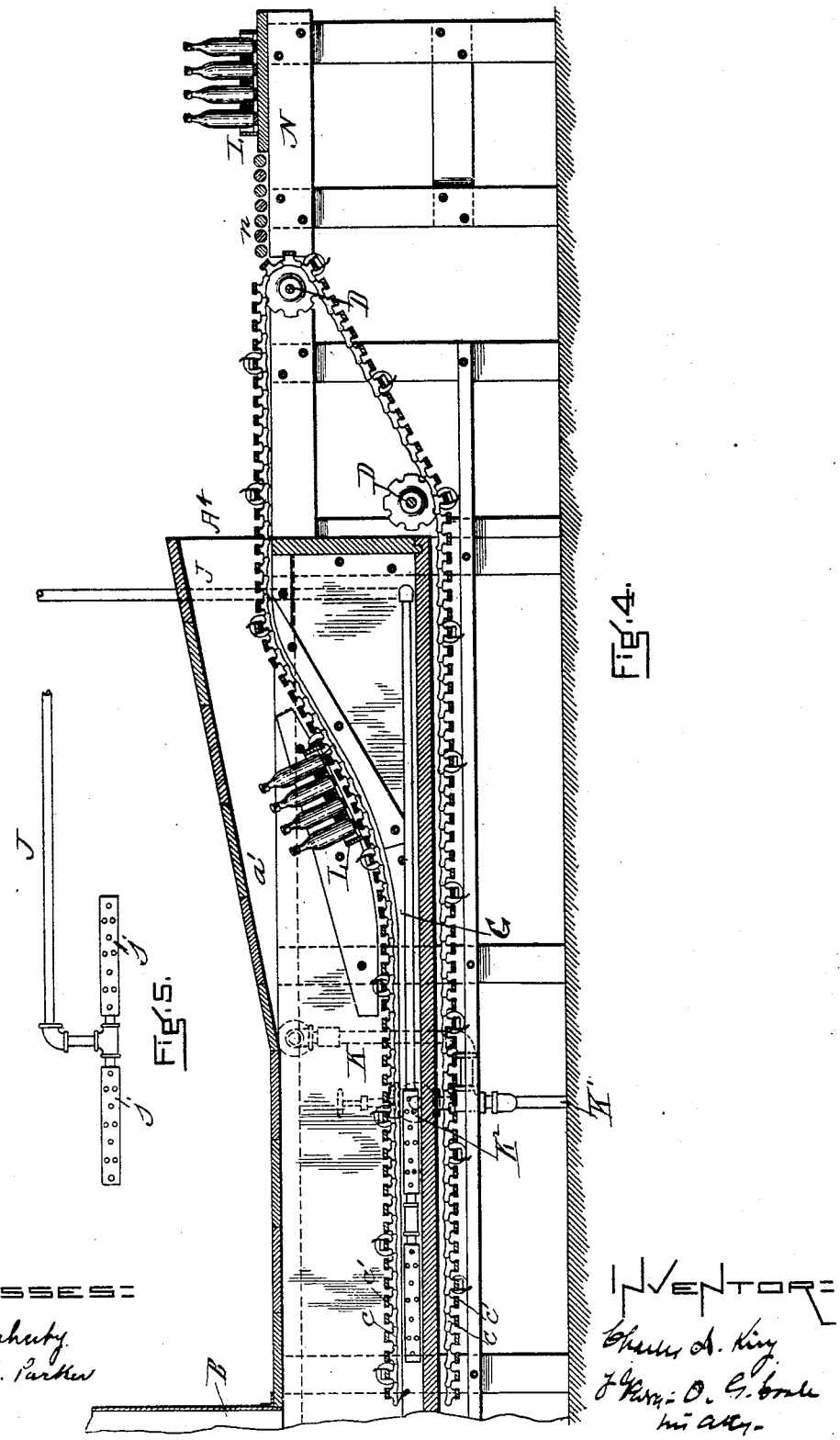

CHARLES A. KING, OF MATTAPOISETT, MASSACHUSETTS.

STERILIZING-MACHINE.

SPECIFICATION forming part of Letters Patent No. 710,784, dated October 7, 1902.

Application filed August 17, 1900. Serial No. 27,148. (No model.)

*To all whom it may concern:*

Be it known that I, CHARLES A. KING, of Mattapoisett, in the county of Plymouth and State of Massachusetts, have invented a new and useful Improvement in Sterilizing-Machines, of which the following is a specification.

It is well known that in order to sterilize beer it should be heated to a temperature of about 160° and kept at that temperature for some time—say thirty minutes or so. It is also well known that glass bottles filled with a cold liquid are liable to break if submitted to as high a temperature without a preliminary warming or if chilled by a sudden draft when hot. For this reason the sterilizing plants of which I have knowledge are either comprised of a single tank, into which when filled with the charge of bottled beer cold water is introduced, which is then heated to the proper temperature and kept at that temperature for the proper length of time and then allowed to run to waste, or a set of three tanks in line have been used, each containing water at a different temperature, the middle tank being the sterilizing-tank and the end tanks containing water at a lower degree of temperature, so as to prepare the bottles for the sterilizing temperature in the one case or for the temperature of the atmosphere in the other. Through this machine, which is continuous in its operation, a charge of bottles is continually passed by means of an endless conveyer of peculiar construction. In apparatus of this latter kind there is of necessity quite a heavy strain on the conveyer-chain, as it is obliged to lift the bottles out of the first tank into the second and out of the second tank into the third, as well as to introduce the bottles at the inlet end of the apparatus and withdraw them at the outlet.

While a preliminary heating and a cooling are both important in a continuous apparatus, I have found that it is not necessary to have separate tanks for this purpose, but that by suspending the cases for a short time over the sterilizing-tank, so that they become warm, and then introducing them gradually the bottles will be properly heated before they reach the sterilizing temperature, and, moreover, they will not crack if removed from the apparatus very gradually into the open air. In an apparatus, therefore, such as is shown in the drawings I have provided but one tank, which serves both for the preliminary heating and for the cooling, as well as for the sterilizing.

My invention will be understood by reference to the drawings, in which—

Figure 1 is a side elevation of an apparatus embodying my invention, a portion of the apparatus being broken away, Fig. 2 being a corresponding plan view. Fig. 3 is an enlarged vertical section of the inlet end; Fig. 4, an enlarged vertical section of the outlet end, and Fig. 5 a plan view of one of the steam-inlets.

A is a water-tight tank, say, about fifty feet long, the length, however, being suitably proportioned to the speed at which the conveyer is run, as will be hereinafter explained. This tank is preferably supported a short distance above the floor upon suitable uprights A' and is provided with a cover $A^2$, from which projects upward a flue B, this flue being located somewhat nearer the outlet end of the apparatus than the inlet. Through the apparatus runs an endless conveyer C of any suitable construction, preferably one having links $c$ at each side, the links being connected by slats $c'$, and a series of rollers $c^2$ being provided, on which the conveyer runs. The links pass around suitable sprockets $d$, mounted on shafts D and located at the ends of the tank, and the conveyer after passing through the tank passes back preferably under it, as shown.

In order to allow the beer-cases to be carried into and out of the tank above the water-level without losing any material portion of the heat therefrom, the walls are preferably made higher at the ends of the tank than along its middle portion, as shown at $a\ a'$, respectively. Power is applied to drive this conveyer by means of an ordinary worm-and-gear mechanism, (shown at E.) Such mechanism, being a well-known expedient for such a purpose, is not shown in detail. Certain of the slats $c$ have cleats $c^3$ in order to check the sliding of the beer-cases in either direction.

The conveyer C passes in at the inlet $A^3$ of the apparatus substantially horizontally, the conveyer being supported by guide-rails $a^2$, on which run the rolls $c^2$, which support the conveyer. Guide-rails $a^3$ are used to hold the conveyer down when necessary. As shown in the drawings, (see Fig. 3,) the horizontal movement of the conveyer lasts for about the length of four cases, and from that point there is a gradual slope downward until the bottom of the tank is reached at the point F, which in the apparatus shown is distant from the end of the tank about one-fifth the entire length of the tank, after which the conveyer moves along horizontally until it reaches a point G near the other end of the tank, from which there is a gradual slope upward again, and the cases pass out at the outlet end $A^4$. The dimensions given are intended to be suggestive rather than essential.

H H' are water-pipes, by means of which the tank is kept full of water, the pipe H' being provided with an automatic float-valve $h$ of any ordinary construction to prevent the water-level from sinking below a predetermined line—for example, the line $x\ x$.

J represents steam-pipes, by means of which the water in the tank is heated. I prefer that they enter the tank at each end and approach for some distance and that their ends be provided with distributers $j$ in order that the steam may be distributed fairly well through the water for the purpose of heating it.

K is an outlet-pipe to prevent an overflow of water from the tank. It is connected with the sewer-inlet K', with which there is also connected a valved outlet $K^2$ for emptying the tank.

L represents the beer-cases.

The method of operation will now be described, from which it will be seen that this apparatus is an absolutely automatic apparatus in the sense that it need not require any especial attendant to handle the beer. It is preferably located in a room which gives space at the inlet end for the corking-machine, so that the corked bottles may be put directly into the sterilizer. The man in charge of the corking-machine rests an empty case upon the conveyer or partially upon the conveyer and upon a suitable rest—for example, M—provided for the purpose, and fills the case with the bottles as he corks them. The conveyer moves through the apparatus at such a speed that it will take a case, say, an hour to pass from the inlet to the outlet, or at about the rate of a foot a minute in a machine of the dimensions described. This speed is so slow that it will allow the man in charge of the corking-machine to fill the case with corked bottles before the case gets fairly out of his reach. Perhaps if he is skilled he may fill two cases placed side by side. He will then place other cases on the conveyer in the rear of the first case and fill them in like manner. In this way the cases of beer are fed to the sterilizing-machine by the man who corks the bottles and without the intervention of another attendant. Each case as it passes into the apparatus under the cover $A^2$ meets with a current of moist warm air and steam rising from the bath contained in the tank and is gradually warmed up, passing as it does very slowly from the extreme end of the tank to that point where it begins to go down into the water and passing with equal slowness down into the water, so that, say, ten minutes or thereabout will be consumed from the time when a case of beer passes under the hood $A^2$ until it is completely covered by the hot water in the tank and the case is running on the tank-floor. There it remains submerged for, say, half an hour while passing from the point F to the point G, when it passes up and out of the tank in the same manner as before and is delivered upon the friction-rolls $n$, which form a portion of the receiving-table N. If thought best, the table N may be located upon the floor of the building above that in which the tank is located, and the conveyer may be extended accordingly, thereby, perhaps, saving still further handling. From this table N the cases are taken by the labeler, who labels the bottles, and they are then ready for the market.

It will be seen, therefore, that whereas the bottled beer must be corked and also must be labeled, the use of the sterilizing-machine above described does not give to either the corker or the labeler any work which he or she did not have before, while at the same time each bottle passes into the machine and is sterilized and delivered again without the intervention of any third hand. In this respect my machine is a vast improvement over any sterilizing-machine of which I now have knowledge, (except one for which I have already applied for Letters Patent of the United States,) no one of which requires the service of less than two men, besides, perhaps, helpers in addition to the corkers and labelers. Moreover, as the temperature of the water in the tank is kept at a constant degree and the water does not need frequent changing the machine may be used with great economy of water.

The simplicity of my machine, its economy of construction, and economy of use will therefore be easily appreciated by those skilled in the art. It is also apparent that while I have described the use of this apparatus for sterilizing beer the apparatus may be used equally as well for various canning or cooking processes where a preliminary cooking is required before the highest temperature is reached or in preserving fruits and vegetables where glass jars are used, which must not be submitted to a very high temperature without a preliminary heating in order that they may not be cracked, the cooking temperature and the water-level being changed according to circumstances. It is also apparent that the exact points at which the charge is actually submerged in the hot water or withdrawn therefrom may differ somewhat in different cases, my invention being, in fact, a cooking apparatus in which the charge to be cooked is submitted to a preliminary heating by being suspended over the body of hot liquid in which it is finally submerged, and, perhaps, also to a preliminary cooling thereafter, thereby saving the building and use of extra tanks for that purpose and utilizing the same heat-supply for the two operations. It is also apparent that instead of the kind of conveyer above described other forms of conveyer may be used—for example, one now in common use and so constructed that each bottle is hung by its neck—my invention not relating to the form of conveyer, but to its relation to the sterilizing-tank.

The purpose of the flue B is to allow the steam and hot air such a means of escape that they will not pass out into the room from the ends of the apparatus, but, on the contrary, there will be a slight inward draft caused at each end of the apparatus.

The hood formed at the outlet end of the apparatus by the walls $a'$ and cover $A^2$ should be extended sufficiently far over the conveyer to protect the bottles from any cross-draft—for example, a draft from an open window or door—and, if thought best, the track at the outlet end of the tank may be arranged with reference to the surface of the water in all respects like that at the inlet.

It will be noted that, in fact, the above apparatus consists of two parts, a vapor-chamber and a hot-water tank, that the hot-water tank, being of substantially equal depth throughout its entire length, contains a body of water of substantially equal temperature throughout its length, the temperature being controlled by proper steam appliances or otherwise, and that the surface of this water forms not only a source of vapor-supply for the vapor-chamber, but also by reason of the equal depth of the tank it causes a substantially equal amount of vapor and degree of heat to be thrown off from all parts of it. Thus the degree of temperature at the two ends of the vapor-chamber will be very nearly that at the middle, notwithstanding the fact that at each end there will be a slight cool draft drawn into the vapor-chamber as the vapor passes off through the flue. If the water were not of equal depth throughout—that is to say, if the floor of the tank were slanting from the ends toward the middle—it is evident that there would not be sufficient depth of the heating medium—namely, the hot water—at the ends to accomplish the necessary heating of this indraft. Moreover, it is also evident that because of this indraft of air of the temperature of the atmosphere many of the bottles would crack if they entered the tank immediately after passing beyond its end wall or were discharged immediately after leaving the tank, no matter how slowly the conveyer moved, for the temperature of that part of the vapor-chamber through which they would then pass would be mainly controlled not by the vapor ascending from the hot water, but by the air entering from the mouth of the chamber.

What I claim as my invention is—

1. An apparatus for sterilizing beer, comprising a water-tank, a hood forming a vapor-chamber, and an endless traveling conveyer, said water-tank being of substantially equal depth throughout its length and provided with means whereby its contents is heated, said vapor-chamber being located over said water-tank and receiving its heat therefrom, and said conveyer being supported substantially horizontally at each end of the apparatus within said vapor-chamber and also in said water-tank intermediate of said end supports, whereby the contents of said conveyer is given a gradual preliminary heating in said vapor-chamber to a temperature approaching a sterilizing temperature, is then submitted to a sterilizing temperature in said water-chamber, and is then gradually cooled in said vapor-chamber before its removal from said apparatus, as described.

2. An apparatus for sterilizing beer and the like, comprising a water-tank and means for heating the water therein, said water-tank being of substantially equal depth throughout its length, a hood located over said water-tank and adapted to collect the vapor arising therefrom and form a vapor-chamber heated equably throughout its length from said water-tank, an endless traveling conveyer and means whereby its contents is supported and carried horizontally over the surface of the water at each end of said vapor-chamber and is allowed to pass through said water-tank intermediate of its passage through said vapor-chamber whereby the contents of said conveyer is given a substantial preliminary heating after it has come under said hood and within said vapor-chamber, and before it enters the water of said water-tank, and a substantial preliminary cooling after it leaves the water and before it leaves the vapor-chamber, as and for the purposes set forth.

3. An apparatus for sterilizing beer and the like, comprising a water-tank and means for heating the water therein, a hood located over said water-tank and provided with a central flue whereby a vapor-chamber is formed over said water-tank, a conveyer supported to carry its contents under said hood and substantially horizontally at each end of said vapor-chamber and intermediate thereof through the water of said water-tank, said water-tank being of substantially the same depth at each end as in the middle thereof, whereby the inward draft at each end of said vapor-chamber is heated by vapor arising from a body of heated water of substantial depth thereunder, and is thereby rendered effective to impart a change of temperature to the contents of said conveyer, as described.

4. In a sterilizing-machine a water-tank, a hood therefor forming a vapor-chamber over said water-tank, means for heating the water in said tank and for maintaining heated vapor at the ends of the tank, and a conveyer supported to carry the package carried thereby through the ends of said vapor-chamber, whereby the vapor at the ends of said vapor-chamber will impart a change of temperature to said packages, and through the water-tank intermediate of the ends of said vapor-chamber, whereby the contents of said packages will be sterilized.

In witness whereof I have hereunto set my name this 13th day of August, 1900.

CHARLES A. KING.

Witnesses:
GEORGE O. G. COALE,
M. E. FLAHERTY.